(12) United States Patent
Nakata et al.

(10) Patent No.: US 6,593,529 B2
(45) Date of Patent: Jul. 15, 2003

(54) GROMMET EQUIPPED WITH RESIN INNER SLEEVE AND METHOD OF INSTALLING THE GROMMET

(75) Inventors: Hiroyuki Nakata, Yokkaichi (JP);
Yukinori Morishita, Yokkaichi (JP);
Tetsuaki Wada, Yokkaichi (JP);
Takayuki Hieda, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 10/170,379

(22) Filed: Jun. 14, 2002

(65) Prior Publication Data

US 2003/0056974 A1 Mar. 27, 2003

(30) Foreign Application Priority Data

Jun. 18, 2001 (JP) .................................. 2001-184011

(51) Int. Cl.$^7$ ................................................ H02G 3/18
(52) U.S. Cl. ................ 174/65 G; 174/135; 174/152 G; 174/153 G; 248/56; 16/2.1
(58) Field of Search ........................... 174/65 G, 152 R, 174/153 G, 135, 152 G, 65 SS, 65 R; 248/56; 16/2.1, 2.2; 439/552; 361/826

(56) References Cited

U.S. PATENT DOCUMENTS

| | | | | |
|---|---|---|---|---|
| 5,279,507 A | * | 1/1994 | Kameyama | 439/552 |
| 5,453,579 A | * | 9/1995 | Cohea | 174/153 G |
| 6,372,995 B1 | * | 4/2002 | Mochizuki et al. | 174/152 G |
| 6,479,748 B2 | * | 11/2002 | Mori | 174/65 G |

FOREIGN PATENT DOCUMENTS

JP        10261464        9/1998

OTHER PUBLICATIONS

English Language Abstract for JP Appln. No. 10–261464. Oct. 30, 1996.

* cited by examiner

Primary Examiner—Chau N. Nguyen
Assistant Examiner—Dhiru R Patel
(74) Attorney, Agent, or Firm—Greenblum & Bernstein, P.L.C.

(57) ABSTRACT

A grommet for installing a wire harness into a penetration hole provided on a car body panel of an automobile. The grommet includes a resin inner sleeve that is firmly stored in an enlarged tubular portion of a grommet main body made of an elastomer. The grommet main body includes the enlarged tubular portion at one end of a small diameter tubular portion through which electric wires can be inserted. A fixation locking hook protrudes from a peripheral wall of the inner sleeve and projects past an edge opening of the enlarged tubular portion. A movable locking hook is arranged on another side of the peripheral wall. The movable locking hook includes a movable piece that is located between two side grooves formed in the peripheral wall. A pair of rectifying ribs protrudes past the movable locking hook. Each rectifying rib has an edge portion that is formed at an acute angle and that is inclined towards an inside. The pair of rectifying ribs are insertable into the penetration hole after the fixation locking hook is inserted therein.

9 Claims, 9 Drawing Sheets

GROMMET EQUIPPED WITH RESIN INNER SLEEVE AND METHOD OF INSTALLING THE GROMMET

CROSS-REFERENCE TO RELATED APPLICATIONS

The present application claims priority under 35 U.S.C. §119 of Japanese Patent Application No. JP 2001-184011 filed on Jun. 18, 2001, the disclosure of which is expressly incorporated by reference herein in its entirety.

BACKGROUND OF THE INVENTION

1. Field of the Invention

The present invention relates to a grommet that is equipped with a resin inner sleeve, and specifically to a grommet which can be mounted in the penetration hole on a car body panel and which is assembled on a wire harness and wired in an automobile. A resin inner sleeve is internally fitted inside of the grommet main body made of an elastic material. The grommet is hooked into the penetration hole on a car body panel with a car body-hooking hook.

2. Background of the Invention

With this kind of grommet, when a door harness which is to be wired to a door side is hung in the penetration hole on a car body panel through the penetration hole of a door panel, for example, the grommet 1 as shown in FIGS. 7A and 7B, is installed on a wire harness between the door panel and the car body panel. Located in the grommet 1 is an inner sleeve 3 that is made of a resin which is assembled into the inside of an enlarged tubular portion 2a. The enlarged tubular portion 2a is arranged at one end of a grommet main body 2 which is made of a rubber or an elastomer. The grommet 1 is designed to be hooked with only one touch by inserting the locking hooks 3a and 3b, provided at the outer face of the inner sleeve 3, in the penetration hole H1 of the car body panel A.

Specifically, the above-mentioned grommet 1, which is hooked in the penetration holes H1 and H2 which were provided on the car body panel A and the door panel B, also includes a enlarged tubular portion 2c which can be mounted in the penetration hole H2 of the door panel B, and is arranged at one end of the bellows shaped small diameter tubular portion 2b of the grommet main body 2. The grommet main body 2 is continuously formed with the enlarged tubular portions 2a and 2c and enlarged tubular portion 2a can be mounted in the penetration hole H1 of the car body panel A. A hooking groove 2d is provided at the outer peripheral face of the enlarged tubular portion 2c, and the hooking groove 2d is adapted to be fitted in the peripheral rim of the penetration hole H2 and allows the grommet 1 to be mounted in a sealed condition.

The inner sleeve 3 is made of a resin and is hooked into the body panel. Located on the side of the grommet having the enlarged tubular portion 2a are locking hooks 3a and 3b which allow the grommet to be hooked into the car body. These hooks 3a and 3b are provided at opposed and/or opposite positions on the outer face of the inner sleeve 3. The outer face of the inner sleeve 3 is slightly protruded or extended from the edge opening of the enlarged tubular portion 2a. The locking hooks 3a and 3b are passed through the penetration hole H1 and are hooked on the peripheral rim of the inner face side of the penetration hole H1. In this manner, the grommet 1 is fixed on the car body panel in a condition in which sealing is maintained, i.e., by adhering seal lip 2f, provided on the opening peripheral rim of the enlarged tubular portion 2a, on the peripheral rim of the outer face side of the penetration hole H1.

In the above-mentioned grommet, when considering the work required to install the grommet into the penetration hole H1 of the car body panel A in the assembly line of an automobile, it is notable that the locking hook 3a of one side of the inner sleeve consists of a fixation locking hook which protrudes from the edge of the peripheral wall of the inner sleeve 3. On the other hand, as shown in FIG. 7B, the locking hook 3b located on the other side of the inner sleeve consists of a movable piece 3d which is arranged between two side grooves 3c that are notched in the peripheral wall. The movable piece 3d has formed thereon the movable locking hook 3b at the edge outer face thereof. As shown in FIGS. 8A and 8B, during the installing of the grommet in the penetration hole H1, the edges of the inner sleeve 3 are obliquely inserted into the penetration hole H1, with the locking hook 3a being inserted into the penetration hole H1 first, and then, the movable locking hook 3b is inserted into the penetration hole H1 by bending it so that it can be hooked into opening H1.

When the grommet is assembled on an automobile, it is difficult to fix and/or precisely position the locking hook 3a at the peripheral wall of the penetration hole H1. The reason is that in order to fix locking hook 3a in penetration hole H1, the grommet must obliquely positioned which can result in a condition as shown in FIG. 9A. It can also be difficult for a worker to recognize the inadequate insertion condition of the grommet. Accordingly, it is possible for the movable locking hook 3b to be inserted inadequately, and the movable locking hook 3b can sometimes hit the car body panel A as shown in FIG. 9B. In a worst case scenario, the movable locking hook 3b can even be destroyed upon installation.

SUMMARY OF THE INVENTION

The present invention provides for a grommet in which the movable locking hook is designed for insertion into the penetration hole so as to be hooked therein while rectifying the inadequate insertion posture of the fixation locking hook which is inserted in advance.

The present invention provides a grommet which can be installed on a wire harness that is inserted into a penetration hole provided on the car body panel of an automobile. A resin inner sleeve is firmly stored in an enlarged tubular portion of a grommet main body made of an elastomer. The enlarged tubular portion is arranged at one end of a small diameter tubular portion through which electric wires can be inserted. A locking hook is used for car body hooking and protrudes from a peripheral wall of the above-mentioned inner sleeve. The locking hook protrudes beyond the edge opening of the above-mentioned enlarged tubular portion. The locking hook located on one side of the inner sleeve is a fixation locking hook that protrudes from the outer face of the above-mentioned peripheral wall. Another locking hook is provided on another side of the inner sleeve and is formed as a movable locking hook. The movable locking hook is located on the edge outer face of a movable piece between two side grooves which are notched on the above-mentioned peripheral wall. A pair of left and right rectifying ribs protrude from the above-mentioned movable locking hook. The rectifying ribs are arranged on both sides the above-mentioned movable piece and cross over the movable piece. The edge portions of the rectifying ribs are formed with an acute angle that is inclined to the inside. The above-mentioned rectifying ribs are inserted in advance into the penetration hole, and then the fixation locking hook can be rectified at the proper hooking position upon insertion of the above-mentioned movable locking hook. The work of inserting and hooking the above-mentioned movable locking hook in the penetration hole is made after inserting and hooking the above-mentioned fixation locking hook in the penetration hole of the above-mentioned car body panel.

The resin inner sleeve of the above-mentioned grommet utilizes rectifying ribs which are provided at a position which is located more inwards than the movable locking hook. These ribs protrude beyond the movable locking hook so that the rectifying ribs can be inserted into the penetration hole before the movable locking hook is inserted into the penetration hole. Using this design, the inadequate insertion and hooking posture of the fixation-locking hook is rectified upon inserting the rectifying ribs in the penetration hole. As a result, the movable locking hook can be more smoothly inserted into the penetration hole. Thus, the normal hooking position of the fixation locking hook is rectified by the rectifying ribs which are inserted in advance, which can accordingly prevent the possible damage from occurring to the movable locking hook when the movable hook hits or engages the car body panel.

On the other hand, when the movable locking hook is inserted into the panel opening, while being deviated from the normal hooking position to an extent that the inadequate insertion posture of the fixation locking hook cannot be rectified, the rectifying ribs will prevent insertion of the grommet into the penetration hole. In this way, a worker will recognize that the fixation locking hook is inserted in an abnormal posture before there is an attempt to insert of the movable locking hook. As a result, the worker will know to attempt to insert the fixation locking hook correctly.

When the connector is firmly stored in the above-mentioned inner sleeve. The peripheral wall of the inner sleeve has a rectangular or near square shaped frame. The connector is connected with electric wire terminals which are inserted and/or pass through the small diameter tubular portion of the grommet main body. The above-mentioned fixation locking hook and the movable locking hook are provided on opposite sides of the inner sleeve. These hooks are thus centrally located on the short sides of the inner sleeve.

The invention therefore provides for a grommet for installing a wire harness into a penetration hole provided on a car body panel of an automobile wherein the grommet includes a resin inner sleeve that is firmly stored in an enlarged tubular portion of a grommet main body made of an elastomer. The grommet main body includes the enlarged tubular portion at one end of a small diameter tubular portion through which electric wires can be inserted. A fixation locking hook protrudes from a peripheral wall of the inner sleeve and projecting past an edge opening of the enlarged tubular portion. A movable locking hook is arranged on another side of the peripheral wall. The movable locking hook includes a movable piece that is located between two side grooves formed in the peripheral wall. A pair of rectifying ribs protruding past the movable locking hook. Each rectifying rib has an edge portion that is formed at an acute angle and that is inclined towards an inside. The pair of rectifying ribs are insertable into the penetration hole after the fixation locking hook is inserted therein.

The invention also provides for a grommet for installing a wire harness into a penetration hole provided on a car body panel of an automobile wherein the grommet includes a grommet main body including an enlarged tubular portion and a small diameter tubular portion through which electric wires can be inserted. A sleeve is firmly stored in the enlarged tubular portion of a grommet main body. A fixation locking hook protrudes from a peripheral wall of the inner sleeve and projecting past an edge opening of the enlarged tubular portion. A movable locking hook is arranged on another side of the inner sleeve. A pair of rectifying ribs protrudes past the movable locking hook. Each rectifying rib has an edge portion that is formed at an acute angle and that is inclined towards an inside. The pair of rectifying ribs are insertable into the penetration hole after the fixation locking hook is inserted therein.

The invention also provides for a method of installing the grommet into a penetration hole of a car body panel of an automobile wherein the method includes installing the wiring harness in the grommet and hooking the inner sleeve into the penetrating hole so that the enlarged tubular portion engages the car body panel.

The invention still further provides for a grommet for installing a wire harness into a penetration hole provided on a car body panel of an automobile. The grommet includes an inner sleeve that is stored in an enlarged tubular portion of a grommet main body. The grommet main body includes the enlarged tubular portion at one end of a small diameter tubular portion through which electric wires can be inserted. A locking hook protrudes from a peripheral wall of the inner sleeve and projects past an edge opening of the enlarged tubular portion. A movable locking hook is arranged on another side of the peripheral wall. The movable locking hook includes a movable piece. At least one rectifying rib protrudes past the movable locking hook. The at least one rectifying rib has an edge portion that is formed at an acute angle and that is inclined towards an inside. The at least one rectifying rib is insertable into the penetration hole after the fixation locking hook is inserted therein.

The movable piece may be located between two side grooves formed in the peripheral wall. The locking hook may include a fixation locking hook. The at least one rectifying rib may include a pair of rectifying ribs.

The invention also provides for a method of installing the grommet into a penetration hole of a car body panel of an automobile wherein the method includes installing the wiring harness in the grommet and hooking the inner sleeve into the penetrating hole so that the enlarged tubular portion engages the car body panel.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

By passing the grommet through the penetration hole H2 of the door panel B in like manner as in the fore-mentioned conventional example, the grommet can be installed on the door harness which passes through the penetration hole H1 of the car body panel A. Then, the connector 5 is connected with the grommet, with the end of the door harness also being connected inside of the grommet 10.

Figure 1:
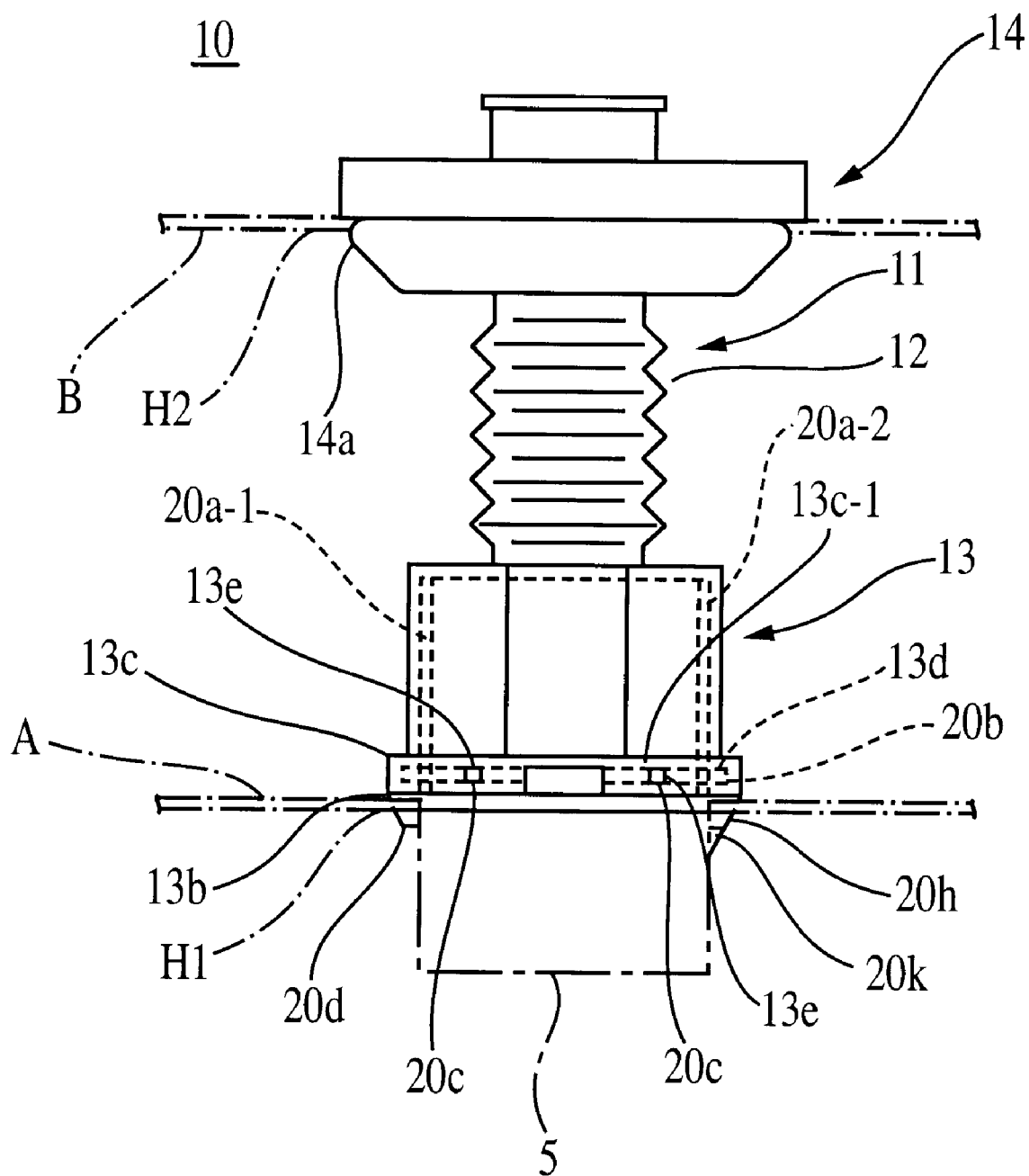
FIG. 1 shows a frontal view of the mode of operation of the grommet of the present invention.
Figure 2:
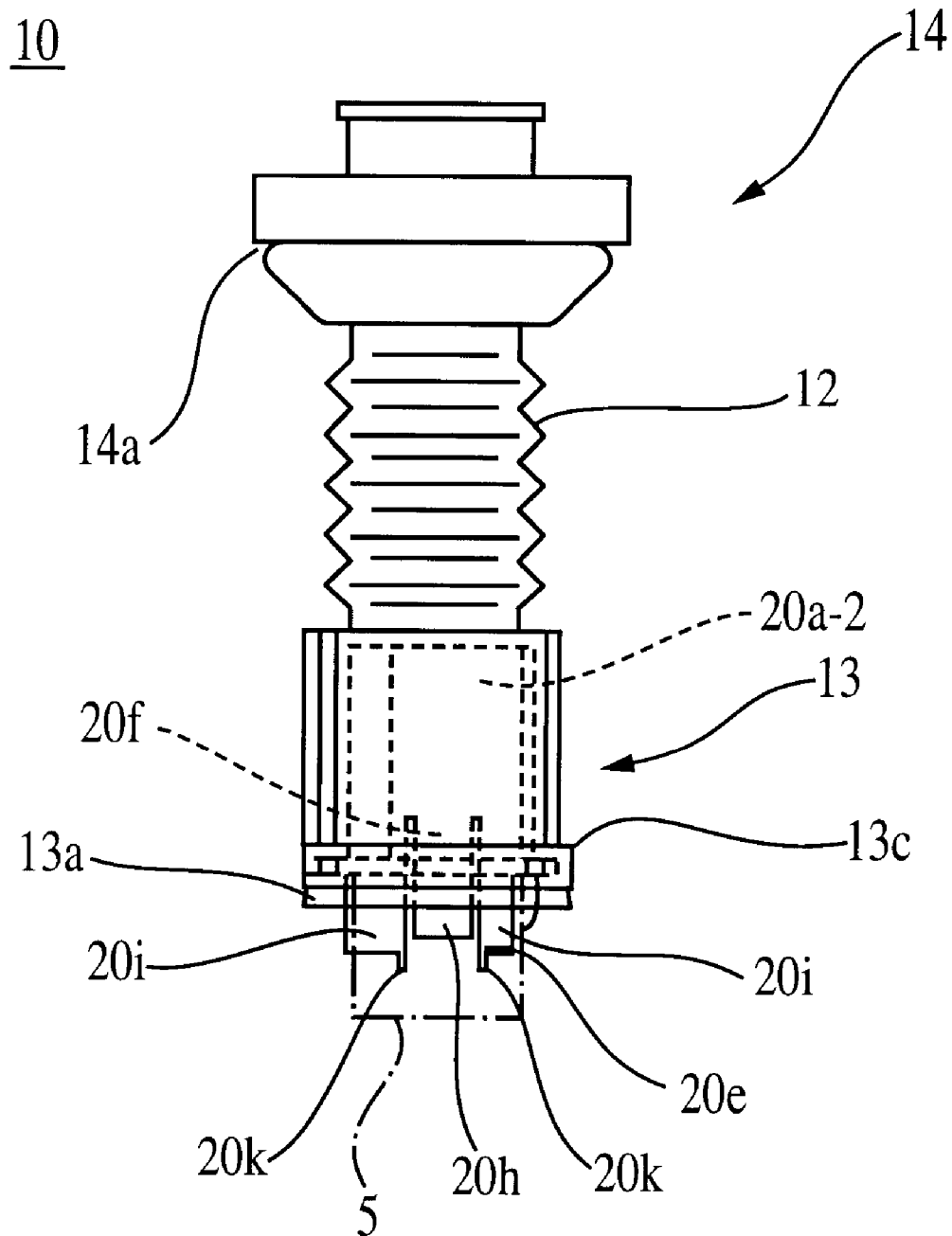
FIG. 2 shows a side view of FIG. 1.
Figure 3:
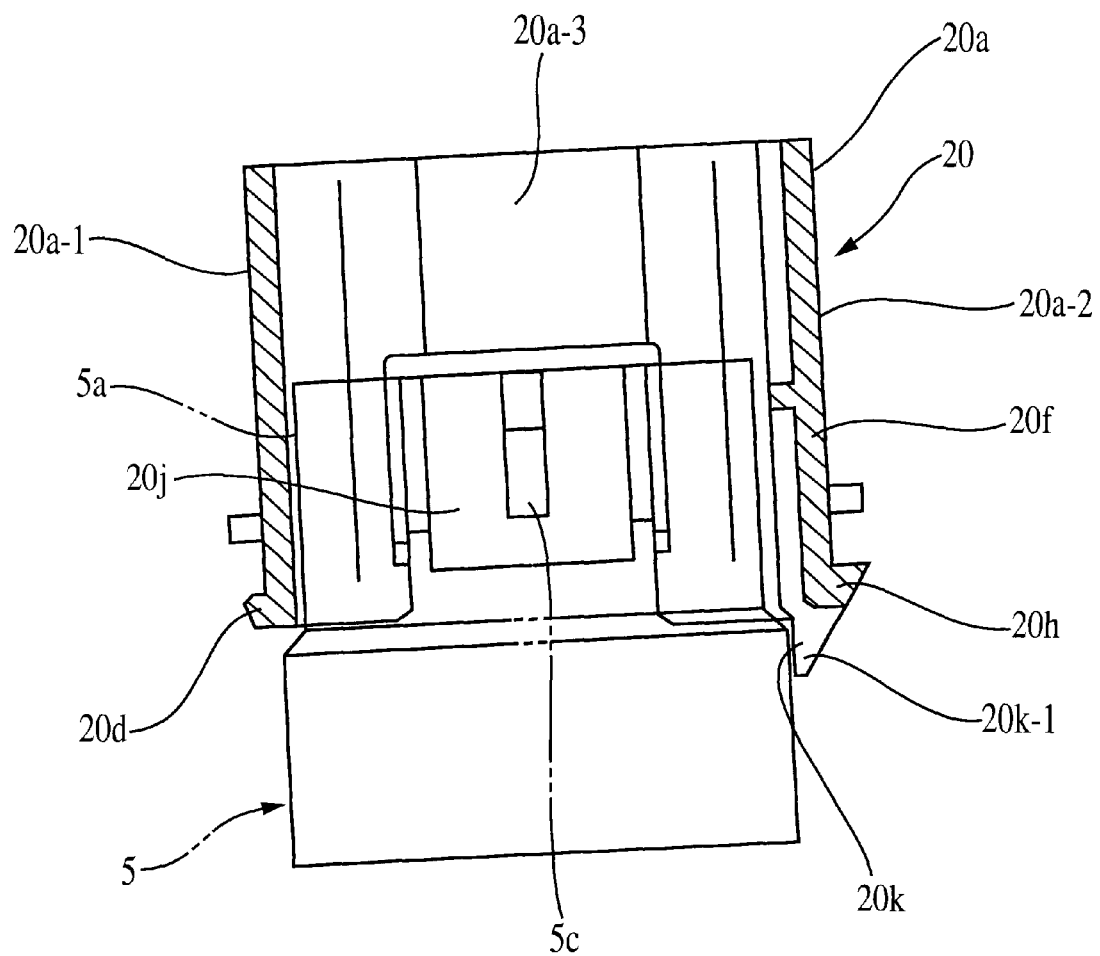
FIG. 3 shows a sectional view of an inner sleeve of FIG. 1.

The grommet 10 shown in FIG. 1 comprises a grommet main body 11 that is made of a rubber or an elastomer and the inner sleeve 20 that is made of a resin. The grommet main body 11 is continuously molded and/or integrally formed with the enlarged tubular portions 13 and 14. The enlarged tubular portions 13 and 14 are arranged at the both ends of the bellows shaped small diameter tubular portion 12, through which electric wires are inserted. Grommet 10 stores or retains the resin inner sleeve 20 inside of the enlarged tubular portion 13. A car body hooking groove 14a is provided on enlarged tubular portion 14 for mounting it in the penetration hole H2 of the door panel B. The groove 14a is concave-shaped and is located at an outer periphery of the above-mentioned enlarged tubular portion 14.

The enlarged tubular portion 13 which stores the inner sleeve 20 has a rectangular or near square tubular shape and includes a seal lip 13b which protrudes there from. The seal lip 13b has an externally opened shape and is located at the outer peripherally of the edge opening 13a. An inner sleeve hooking portion 13c is C-shaped or ⊃-shaped, and is provided at the opening peripheral rim which is formed continuously with the seal lip 13b. Hooking flange portions 20b are formed and/or protrude from the peripheral wall 20a of the inner sleeve 20 are adapted to be inserted in the flange grooves 13d which are opened at the inner peripheral face of the inner sleeve hooking portion 13c. Pin holes 13e protrude from the bottom face of the flange grooves 13d at both sides of the opposed long side 13c-1. Pins 20c protrude from the hooking flange portions 20b of the inner sleeve and are inserted in holes 13e.

Located on the peripheral wall 20a of the above-mentioned inner sleeve 20 and protruding from the edge opening 13a of the above-mentioned enlarged tubular portion 13 is arranged a fixation locking hook 20d. The fixation locking hook 20d protrudes towards the outside direction at the edge center of short side wall 20a-1. A pair of side grooves 20e are provided at short side wall 20a-2. Located between the grooves 20e is arranged a movable or deflecting piece 20f. A movable locking hook 20h is formed as a protrusion over a the whole width and at an edge outer face of movable piece 20f. One or more slits 20m are used to facilitate sliding and are located at the outer face of the movable locking hook 20h.

A pair of the left and right rectifying ribs 20k protrude and/or extend higher than the movable locking hook 20h. These are provided at the inner face and are formed as two side peripheral walls 20i which cross over the movable piece 20f via grooves 20e. The edge portions 20k-1 of the rectifying ribs 20k-1 are formed at an acute angle in which is inclined towards the inside.

Further, the inclined angle of the edge portions 20k is about the same angle as the inclined angle of the movable locking hook 20h, and it is set and/or configured in such a manner that the movable locking hook 20h is easily inserted into the penetration hole H1 in succession with the rectifying ribs 20k.

Further, a locking portion 20j is provided which can be locked with the connector 5 at the one side of the long side 20a-2 of the peripheral wall of the inner sleeve. The locked portion 5c is provided at an outer face of the housing 5a of the connector 5, and the connector 5 is internally fitted in the inner sleeve 20.

Figure 4:
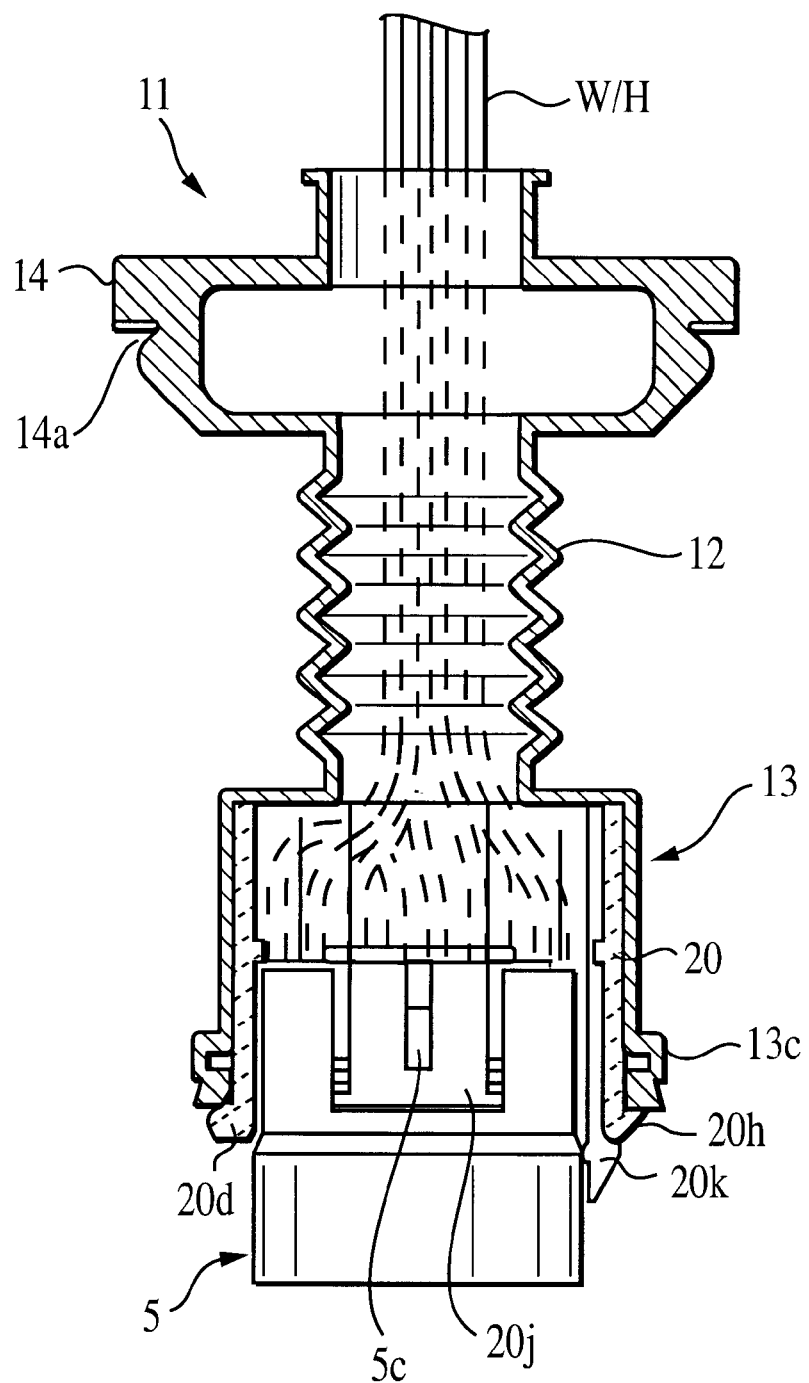
FIG. 4 shows a sectional view of a condition in which electric wires with a connector are passed in a grommet.

As shown in FIG. 4, when the wire harness W/H is inserted into the grommet main body 11, the connector 5 can be connected with the edge of the wire harness W/H and fixed in the inner sleeve 20. The grommet 10 with the inner sleeve 20 firmly stored in the enlarged tubular portion 13 can then be assembled in an automobile assembly line. The locking hook of the inner sleeve 20 is inserted and hooked in the penetration hole H1 of the car body panel A through the penetration hole H2 of the door panel B.

Figure 5A:
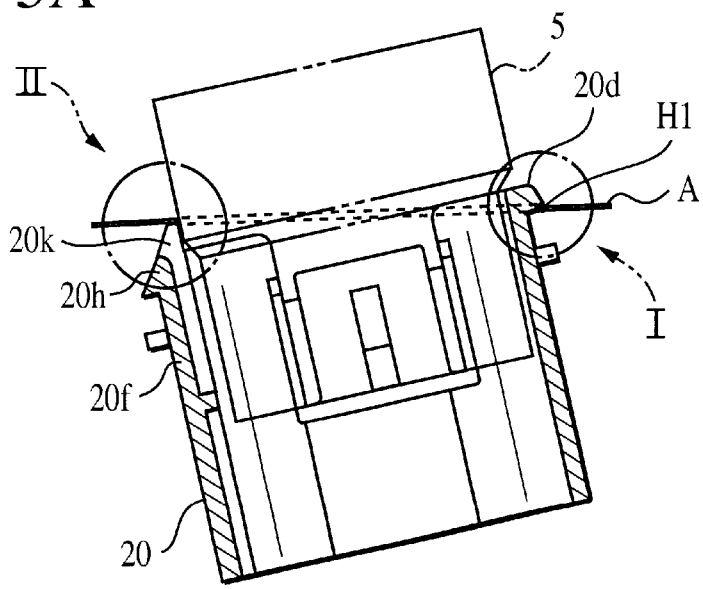
FIG. 5A shows a sectional view of a condition in which the fixation locking hook of a grommet is inserted and hooked in the penetration hole on a car body panel.
Figure 5B:
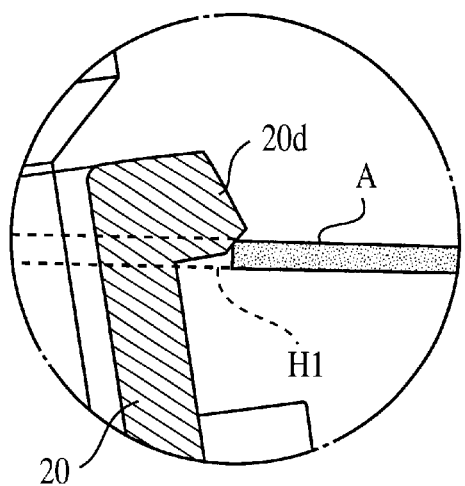
FIG. 5B shows a magnified view of I of FIG. 5A.
Figure 5C:
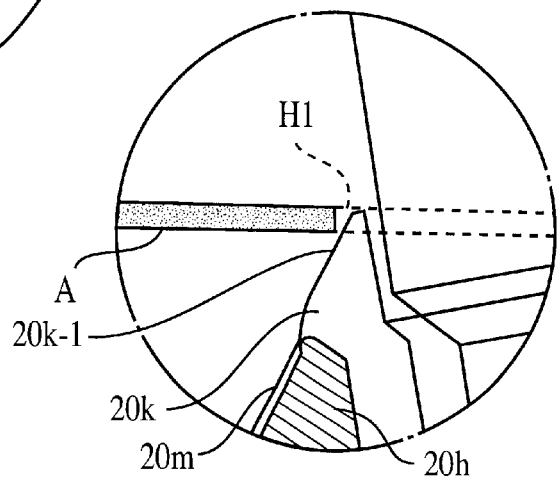
FIG. 5C shows a magnified view of II of FIG. 5A.

In this way, as shown in FIG. 5A and 5B, the edge face of the inner sleeve 20 is first inclined against the penetration hole H1. Then, the fixation locking hook 20d is inserted, and the grommet 10 is hooked in the penetration hole H1. Next, the rectifying ribs 20k are inserted as shown in FIG. 5C while the movable piece 20f is subjected to bending or deflection towards the inside.

Figure 6:
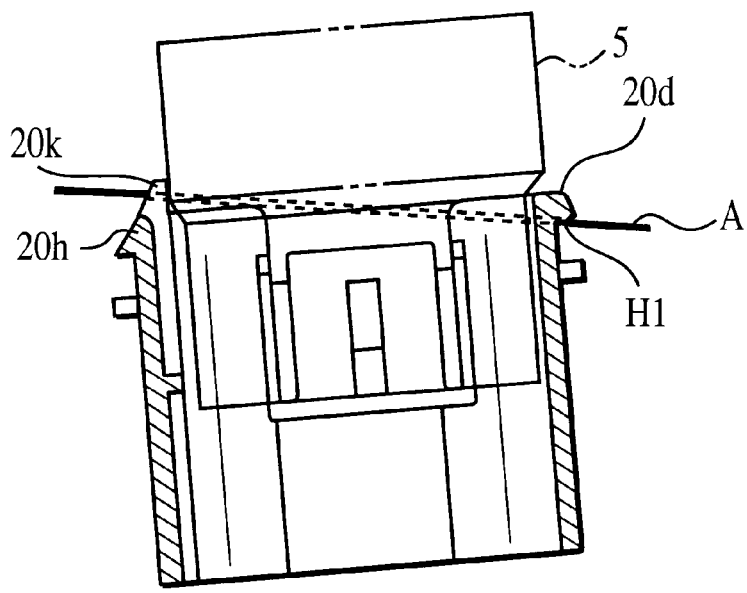
FIG. 6 shows the inserting and hooking of the movable locking hook of a grommet in the penetration hole on a car body panel.
Figure 6:
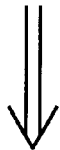
Figure 6:
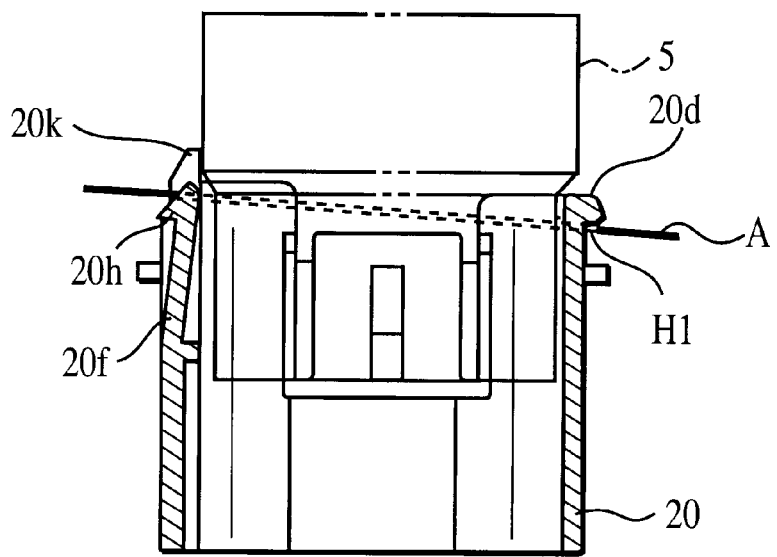
Figure 7A:
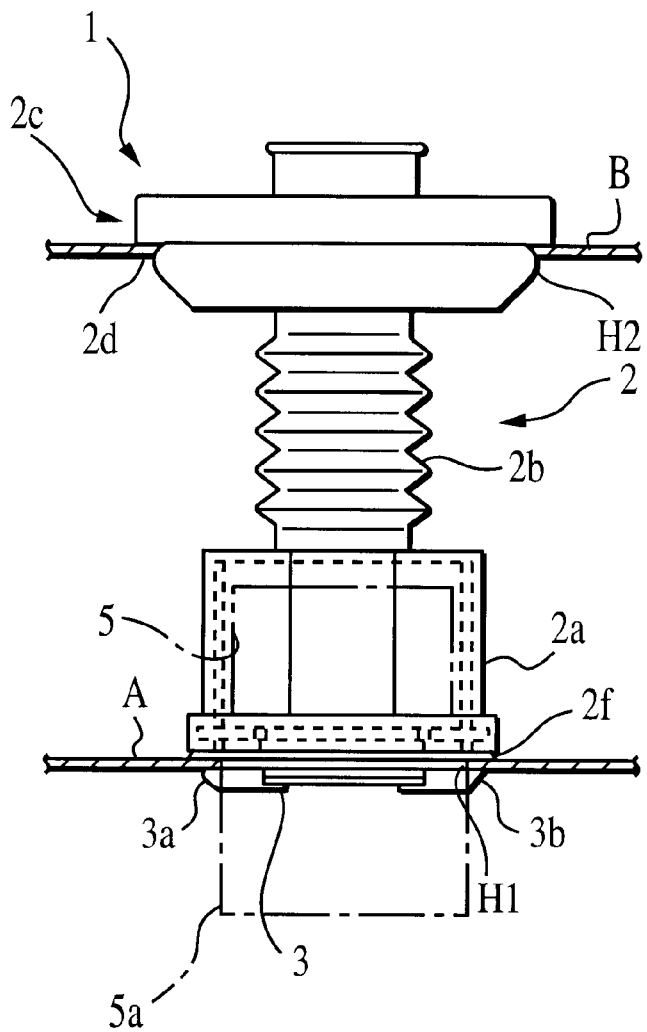
FIG. 7A shows a frontal view showing a conventional grommet.
Figure 7B:
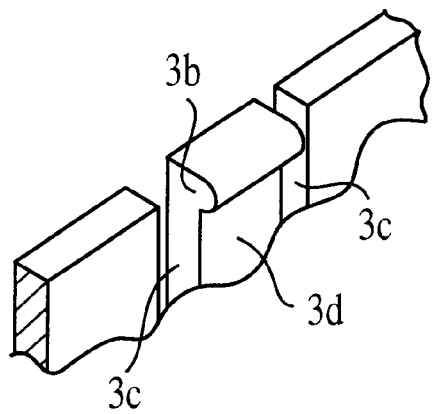
FIG. 7B shows a magnified perspective view of an essential portion.
Figure 8A:
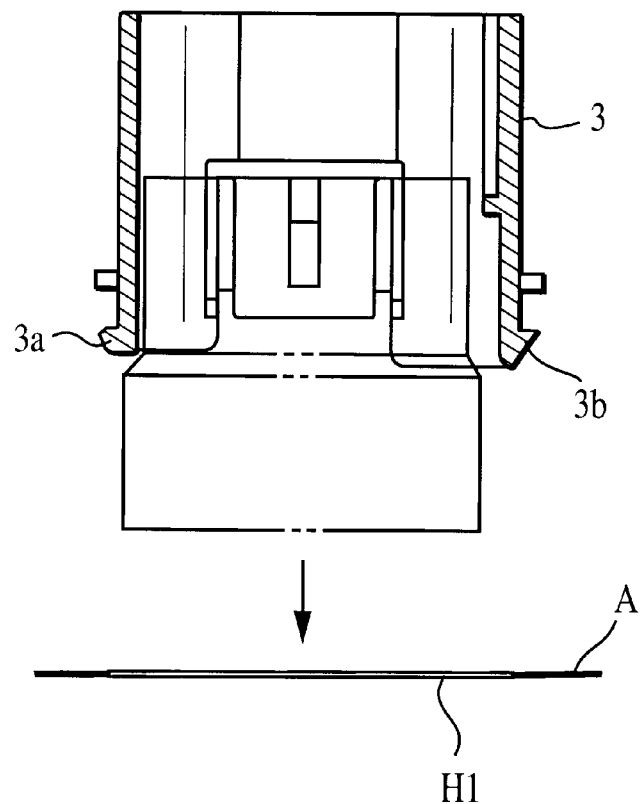
FIGS. 8A and 8B shows a method for installing the grommet on a car body.
Figure 8B:
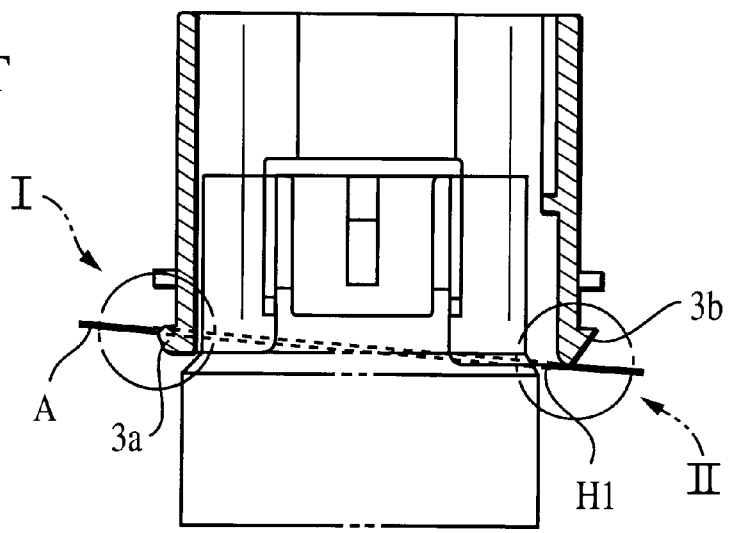
Figure 9A:
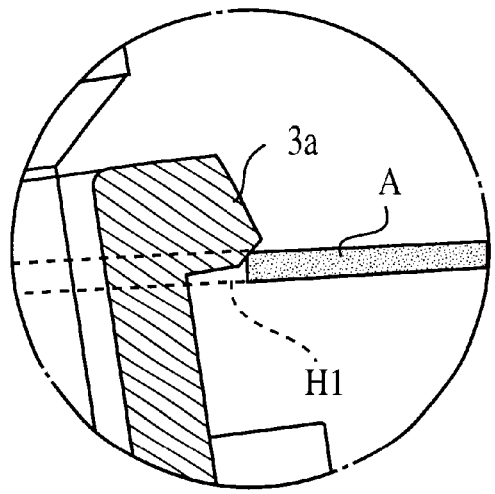
FIG. 9A shows a magnified view of I of FIG. 8B.
Figure 9B:
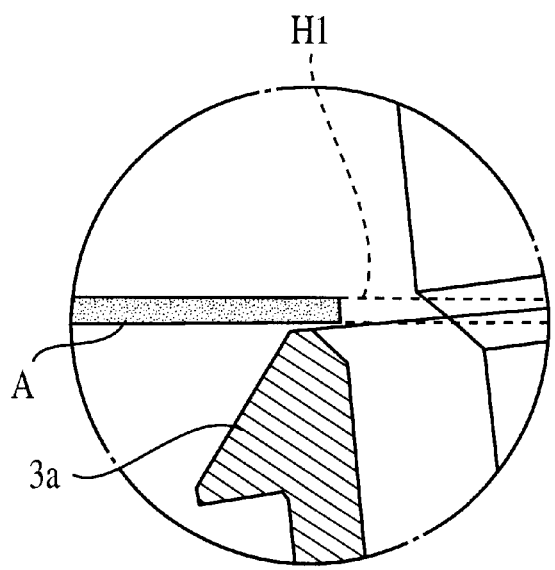
FIG. 9B shows a magnified view of II of FIG. 8B.

Since the rectifying ribs 20k are situated at a position which is more inwardly than the movable locking hook 20h and the edge thereof is inclined to the inside, it can be easily inserted into the penetration hole H1. Further, the rectifying ribs 20k are situated at both sides, therefore when the fixation locking hook 20d, which was inserted in advance, is in an inadequate hooking posture as shown in FIG. 5B, it is rectified so that this is situated at a normal position. When the fixation locking hook 20d is installed in a normal position, the rectifying ribs 20k can be inserted in advance. This makes insertion of the movable locking hook 20h into the penetration hole H1 easier, as shown in FIG. 6. In this way, the movable locking hook 20h can be inserted into the penetration hole H1 without hitting against the car body panel A. The movable locking hook 20h is inserted into the penetration hole H1 passes through the penetration hole H1 while being bent to the inside, and is elastically restored to the original posture after passing through hole H1. As a result, it is hooked at the peripheral rim of the penetration hole H1.

The rectifying ribs 20k ensure that the grommet can be inserted into the penetration hole H1 without causing damage to the movable locking hook 20h. For example, the rectifying ribs 20k will not allow the grommet to be inserted if the insertion posture of the fixation locking hook 20d is greatly deviated from the normal position. Further, even if it is inserted, a worker can recognize that the fixation locking hook 20d is in an inadequate insertion posture, because the worker will experience a great resistance to insertion of the grommet as a result of this design. Accordingly, since the rectifying ribs 20k and the movable locking hook 20h are inserted after repeating the insertion of the fixation locking hook 20d, no damage occurs even if the fixation locking hook 20d hits the car body panel A.

Further, in the above-mentioned mode of operation, a grommet that firmly stores a connector in an inner sleeve is inserted into a panel opening. However, the invention also contemplates a grommet which can be insertion without a connector being fixed in the inner sleeve.

As is clear from the above-noted description, one of the hooks for car body hooking is provided in the inner sleeve and is made as the fixation locking hook. Another hook is made as the movable locking hook. After the fixation locking hook is first hooked in the penetration hole, the rectifying ribs are inserted into the penetration hole and then the movable locking hook is hooked in the penetration hole. In this way, the insertion and hooking posture of the fixation locking hook can be rectified by the rectifying ribs, thereby preventing damage to the movable locking hook which can result from it hitting the car body panel.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A grommet for installing a wire harness into a penetration hole provided on a car body panel of an automobile, the grommet comprising:
   a resin inner sleeve that is firmly stored in an enlarged tubular portion of a grommet main body made of an elastomer;
   the grommet main body including the enlarged tubular portion at one end of a small diameter tubular portion through which electric wires can be inserted;
   a fixation locking hook protruding from a peripheral wall of the inner sleeve and projecting past an edge opening of the enlarged tubular portion;
   a movable locking hook arranged on another side of the peripheral wall;
   the movable locking hook comprising a movable piece that is located between two side grooves formed in the peripheral wall;
   a pair of rectifying ribs protruding past the movable locking hook;
   each rectifying rib having an edge portion that is formed at an acute angle and that is inclined towards an inside,
   wherein the pair of rectifying ribs are insertable into the penetration hole after the fixation locking hook is inserted therein.

2. A grommet for installing a wire harness into a penetration hole provided on a car body panel of an automobile, the grommet comprising:
   a grommet main body including an enlarged tubular portion and a small diameter tubular portion through which electric wires can be inserted;
   a sleeve that is firmly stored in the enlarged tubular portion of the grommet main body;
   a fixation locking hook protruding from a peripheral wall of the sleeve and projecting past an edge opening of the enlarged tubular portion;
   a movable locking hook arranged on another side of the inner sleeve;
   a pair of rectifying ribs protruding past the movable locking hook;
   each rectifying rib having an edge portion that is formed at an acute angle and that is inclined towards an inside,
   wherein the pair of rectifying ribs are insertable into the penetration hole after the fixation locking hook is inserted therein.

3. A method of installing the grommet of claim 1 into a penetration hole of a car body panel of an automobile, the method comprising:
   installing the wiring harness in the grommet; and
   hooking the inner sleeve into the penetrating hole so that the enlarged tubular portion engages the car body panel.

4. A method of installing the grommet of claim 2 into a penetration hole of a car body panel of an automobile, the method comprising:
   installing the wiring harness in the grommet; and
   hooking the inner sleeve into the penetrating hole so that the enlarged tubular portion engages the car body panel.

5. A grommet for installing a wire harness into a penetration hole provided on a car body panel of an automobile, the grommet comprising:
   an inner sleeve that is stored in an enlarged tubular portion of a grommet main body;
   the grommet main body including the enlarged tubular portion at one end of a small diameter tubular portion through which electric wires can be inserted;
   a locking hook protruding from a peripheral wall of the inner sleeve and projecting past an edge opening of the enlarged tubular portion;
   a movable locking hook arranged on another side of the peripheral wall;
   the movable locking hook comprising a movable piece;
   at least one rectifying rib protruding past the movable locking hook;
   the at least one rectifying rib having an edge portion that is formed at an acute angle and that is inclined towards an inside,
   wherein the at least one rectifying rib is insertable into the penetration hole after the fixation locking hook is inserted therein.

6. The grommet of claim 5, wherein the movable piece is located between two side grooves formed in the peripheral wall.

7. The grommet of claim 5, wherein the locking hook comprises a fixation locking hook.

8. The grommet of claim 5, wherein the at least one rectifying rib comprises a pair of rectifying ribs.

9. A method of installing the grommet of claim 5 into a penetration hole of a car body panel of an automobile, the method comprising:
   installing the wiring harness in the grommet; and
   hooking the inner sleeve into the penetrating hole so that the enlarged tubular portion engages the car body panel.

* * * * *

UNITED STATES PATENT AND TRADEMARK OFFICE
CERTIFICATE OF CORRECTION

PATENT NO.     : 6,593,529 B2
DATED          : July 15, 2003
INVENTOR(S)    : H. Nakata et al.

It is certified that error appears in the above-identified patent and that said Letters Patent is hereby corrected as shown below:

<u>Column 8,</u>
Lines 7 and 27, before "sleeve" delete "inner".

Signed and Sealed this

Sixth Day of April, 2004

JON W. DUDAS
*Acting Director of the United States Patent and Trademark Office*